Jan. 30, 1968 D. FIRTH ETAL 3,366,017
BALL PISTON HYDROSTATIC MACHINES
Filed Feb. 7, 1966

United States Patent Office 3,366,017
Patented Jan. 30, 1968

3,366,017
BALL PISTON HYDROSTATIC MACHINES
Donald Firth and Sinclair Cunningham, Glasgow, Scotland, assignors to National Research Development Corporation, London, England, a corporation
Filed Feb. 7, 1966, Ser. No. 525,692
Claims priority, application Great Britain, Feb. 11, 1965, 5,898/65
6 Claims. (Cl. 92—172)

ABSTRACT OF THE DISCLOSURE

A piston assembly comprises a ball which is a close sliding fit in a cylinder bore and a substantially rigid disc which is also a close sliding fit in the bore. The disc is located behind the ball and has one face of part-spherical contour with the same radius of curvature as the ball to provide a seating therefor. The disc also includes a relatively large circular central bore and a plurality of subsidiary ports disposed around the part-spherical face of the disc for maintaining a thin film of oil between the ball and the face.

---

This invention relates to ball piston hydrostatic machines of either the linear or rotary type, and more particularly to a piston arrangement therefor. In such machines, each piston comprises a ball which is a close sliding fit in a cylinder bore to which oil is admitted, or from which it is exhausted, under the control of a pintle valve (in a rotary machine) or its equivalent (in a linear machine). The balls engage a cam track the lobe height of which is sufficiently less than the ball radius to ensure that a ball never projects from the mouth of the cylinder to its full radius.

A hydrostatic machine is one in which the mechanical output (in the case of a motor) or mechanical input (in the case of a pump) is a function of the pressure or potential energy of the working fluid rather than its velocity or kinetic energy. Hence, losses in the fluid circuit due to high rates of flow through ports and pipes are negligible.

When the number of strokes of a ball piston falls below about 200 per minute, the rate of oil leakage past the ball rises to a value which is a significant proportion of the total volume fed to the cylinder, i.e. about 10%. The efficiency of the machine, either as a pump or a motor, thus falls off significantly, but since the ball must at all times be free to rotate within the cylinder about any axis of symmetry of the ball—since, especially in a rotary machine, the cylinder block must have some freedom of movement relative to the cam track in a direction at right angles to the principal direction of travel of the balls over the track—no form of resilient pressure seal can be provided on a ball.

It is an object of the present invention to provide an auxiliary piston to cooperate with the ball in providing the required conversion between hydrostatic and mechanical energy and at the same time to improve the efficiency of the oil seal within the cylinder.

According to the present invention, an auxiliary piston for a ball piston hydrostatic machine comprises a substantially rigid disc of a diameter such that it is a close sliding fit in the bore of a cylinder and having its front or outer face of part-spherical contour with the same radius as the ball, and having a port opening through the thickness thereof to allow the passage of oil into the cylinder bore behind the ball.

Preferably, the disc has a plurality of ports formed therethrough in a symmetrical pattern about the axis of the disc.

Advantageously, the disc is of a low friction material such as polytetrafluorethylene.

Conveniently, a compression spring is located between the back face of the disc and a fixed abutment within the cylinder, such as the inner end of the cylinder bore.

A practical embodiment of the present invention will now be particularly described, by way of example only, with reference to the accompanying drawings, in which.

Figure 1:
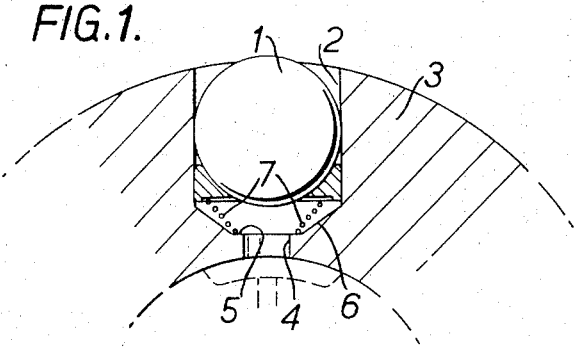
FIGURE 1 is an axial section through a cylinder of a rotary machine having a composite piston assembly according to the present invention.
Figure 4:
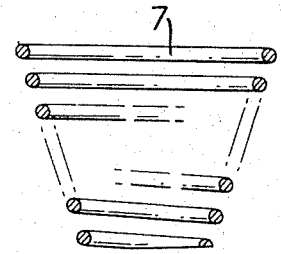
FIGURE 4 is a section through the compression spring.

Referring first to FIGURE 1 of the drawings which illustrates one cylinder and piston of a rotary machine, the ball piston 1 is reciprocable in a cylinder 2 under the control of an annular cam track (not shown). The inner end of the cylinder 2 communicates via a port 4 with the ports of a conventional pintle valve (also not shown). The port 4 opens through a plane inner end wall 5 of the cylinder which is of less diameter than the bore in which the ball 1 reciprocates, and is connected thereto by a conical wall section 6. The annular area of the end wall 5 surrounding the port 4 constitutes an abutment for a spiral compression spring 7 (see also FIGURE 4) to be referred to later.

Behind the ball 1, i.e. between it and the inner end wall 5 of the cylinder 2, is located an auxiliary piston in the form of a disc 8 which is a snug sliding fit in the main bore of the cylinder 2. This disc has a part-spherical front face 9 of the same radius as the ball so that the ball can seat snugly against the disc 8.

Figure 2:
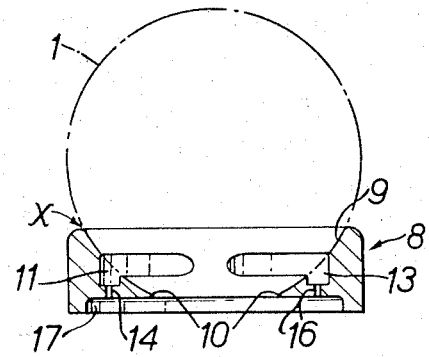
FIGURE 2 is an enlarged view of the auxiliary piston of FIGURE 1.
Figure 3:
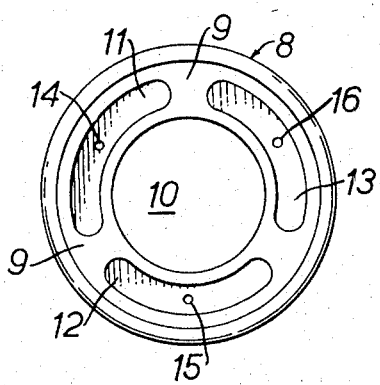
FIGURE 3 is a plan view of the auxiliary piston of FIGURE 2 as seen from the open end of the cylinder.

Referring to FIGURES 2 and 3, the disc 8 has a relatively large central opening 10 which constitutes the main passage for oil flowing to and around the ball piston 1. At the same time, subsidiary ports in the form of arcuate pockets 11, 12 and 13 are formed symmetrically about the central opening 10 in the part-spherical front face of the disc, each pocket communicating with the space behind the disc 8 through a respective bleed port 14, 15, 16. Each port 11, 12, 13 subtends an angle of about 90° at the axis of the cylinder, and the ports are normally closed when the ball 1 seats on the part-spherical front face 9 of the disc 8.

The function of the pockets 11, 12, 13 is to maintain a thin film of oil between the ball 1 and the face 9 so as to leave the ball as free as possible to rotate about any axis of symmetry as it follows the cam track without undue friction between it and the disc 8. In any case, however, the disc 8 will normally be made of a low friction material which may be any of the well-known impregnated sintered metal bearing materials or a polytetrafluorethylene. The disc 8 is a snug sliding fit within the cylinder 2 to afford an efficient seal against leakage of oil past its circumferential wall without imposing any significant resistance to its axial displacement in the cylinder.

If pressure in the port 4 is high, pressure at the point $x$ in FIGURE 2 (where the surface of the ball 1 meets the rim of the front face 9) is lower due to the working clearance between the ball 1 and the cylinder bore 2, and to the impedance of the path between the ball and the face 9. There is thus a pressure gradient across the auxiliary piston 8. At the same time, the pressure in the port 4 is applied to the pockets 11, 12, 13 through the bleed ports 14, 15 and 16 to maintain the thin film of oil between the ball and the auxiliary piston. Due to the symmetrical arrangement of the pockets, the ball 1 experiences a centralising force which tends to maintain even clearance all round between the ball and the cylinder. Thus, the frictional drag—and hence the rate of wear—between the ball 1 and the cylinder bore 2 is kept to a relatively low level.

The function of the compression spring 7 is to ensure the maintenance of contact between the auxiliary piston 8 and the ball 1 under conditions of low oil pressure.

The above described construction serves to improve the oil seal between the piston assembly 1, 8 and cylinder 2 and permits the use of a standard size ball 1 which can have greater tolerance on diameter than is usually the case where the ball alone acts as the piston.

We claim:

1. For use in a ball piston hydrostatic machine having a plurality of cylinder bores in which pistons reciprocate under the control of a cam and to which oil is admitted or from which oil is exhausted under the control of a valve, an improved piston assembly comprising a ball which is a close sliding fit in a cylinder bore and a substantially rigid disc which is also a close sliding fit in the cylinder bore and located behind the ball, the disc having one face of part-spherical contour with the same radius of curvature as the ball to provide a seating therefor and having a relatively large circular central bore coaxial with the disc and a plurality of subsidiary ports disposed symmetrically therearound in the part-spherical face of the disc and in communication with the back face of said disc.

2. An improved piston assembly according to claim 1 wherein said subsidiary ports consists of arcuate pockets formed symmetrically around said central bore in the part-spherical face of the disc, each pocket communicating with the back face of the disc via a respective bleed port.

3. An improved piston assembly according to claim 1 wherein the back face of the disc is planar.

4. For use in a ball piston hydrostatic machine having a plurality of cylinder bores in which ball pistons reciprocate under the control of a cam and to which oil is admitted or from which oil is exhausted, under the control of a valve, each ball piston being a close sliding fit within its cylinder bore, the improvement comprising an auxiliary piston consisting of a substantially rigid disc of a diameter such that it is a close sliding fit in a cylinder bore and having one face of part-spherical contour with the same radius as the ball to provide a seating for the ball, the disc having a large circular central bore coaxial with the disc and a plurality of subsidiary ports disposed symmetrically therearound in the part-spherical face of the disc and in communication with the back face of said disc.

5. An auxiliary piston according to claim 4 wherein the subsidiary ports are in the form of arcuate pockets formed symmetrically around the central bore in the part-spherical face of the disc, each pocket communicating with the back face of the disc via a respective bleed port.

6. For use in a ball piston hydrostatic machine having a plurality of cylinder bores in which pistons reciprocate under the control of a cam and to which oil is admitted or from which oil is exhausted under the control of a valve, an improved piston assembly comprising a ball which is a close sliding fit in a cylinder bore and a substantially rigid disc which is also a close sliding fit in the cylinder bore and located behind the ball, the disc having one face of part-spherical contour with the same radius of curvature as the ball to provide a seating therefor and having a relatively large circular central bore coaxial with the disc and at least one subsidiary port located in said part-spherical face and disposed outwardly of and around said central bore, said at least one port being in communication with the back face of said disc.

References Cited

UNITED STATES PATENTS

| | | | |
|---|---|---|---|
| 683,834 | 10/1901 | Beckfield | 103—161 |
| 1,518,851 | 12/1924 | Hutchison et al. | 103—161 |
| 2,237,018 | 4/1941 | Tweedale | 103—161 |
| 2,571,538 | 10/1951 | Christensen | 92—135 X |
| 2,712,794 | 7/1955 | Humphreys | 103—161 |
| 2,797,643 | 7/1957 | Sherman | 103—161 |
| 2,862,455 | 12/1958 | Ferris | 103—161 |

FOREIGN PATENTS

| | | |
|---|---|---|
| 470,950 | 6/1914 | France. |
| 579,539 | 7/1958 | Italy. |

CARLTON R. CROYLE, *Primary Examiner.*

MARTIN P. SCHWADRON, *Examiner.*

I. C. COHEN, *Assistant Examiner.*